Figure 4:
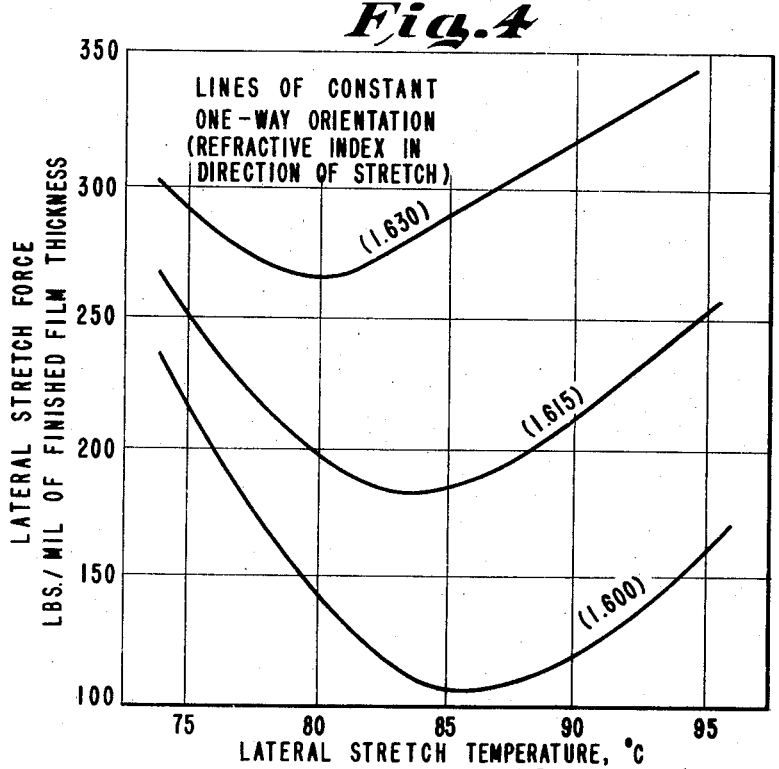

Sept. 22, 1959   E. F. HAUGH   2,904,841
PREPARATION OF ORIENTED POLYMER FILMS
Filed Oct. 11, 1957   2 Sheets-Sheet 1
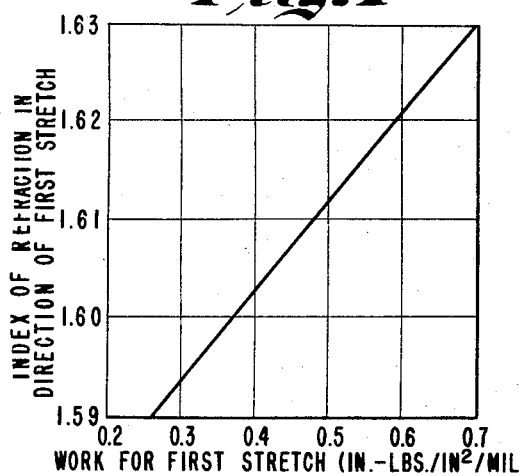
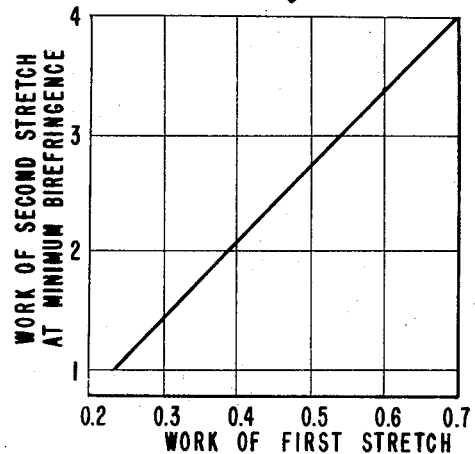
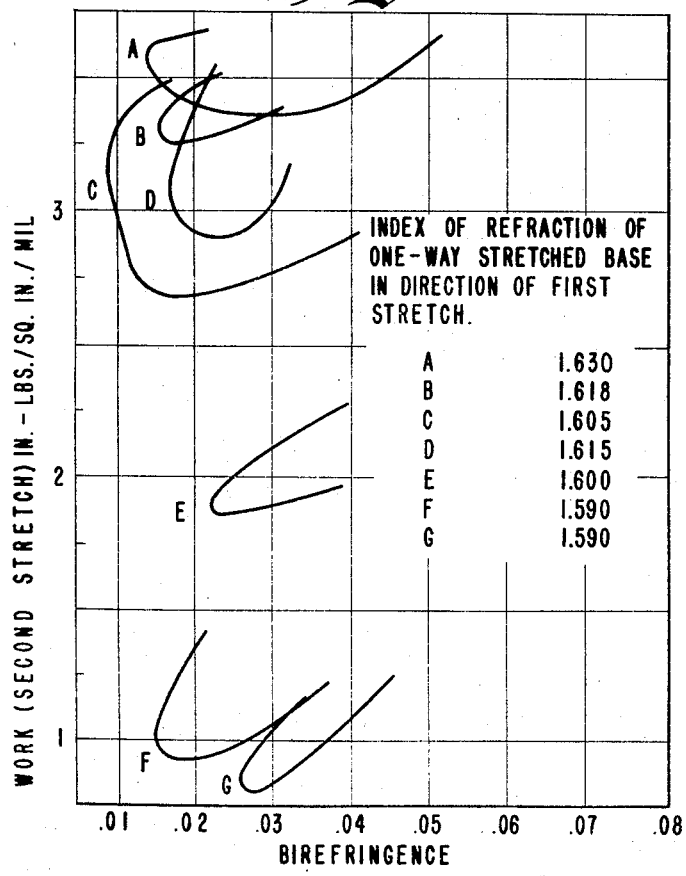
INVENTOR
EUGENE FREDERICK HAUGH
BY
ATTORNEY Sept. 22, 1959 E. F. HAUGH 2,904,841
PREPARATION OF ORIENTED POLYMER FILMS
Filed Oct. 11, 1957 2 Sheets-Sheet 2

INVENTOR
EUGENE FREDERICK HAUGH
BY
Lynn Barratt Morris
ATTORNEY

United States Patent Office 2,904,841
Patented Sept. 22, 1959

2,904,841
PREPARATION OF ORIENTED POLYMER FILMS

Eugene Frederick Haugh, Dayton, N.J., assignor to E. I. du Pont de Nemours and Company, Wilmington, Del., a corporation of Delaware Application October 11, 1957, Serial No. 689,561

7 Claims. (Cl. 18—48)

This invention relates to the preparation of oriented films of linear polymers. More particularly, the invention relates to a process for producing an oriented linear polymeric film having balanced physical properties in the major plane of the film from an amorphous orientable linear polymer. Still more particularly, it relates to such a process wherein the amount of work done in a second stretching of the film is controlled with relation to the amount of work done in stretching the film in one direction.

It is well known that the physical properties of linear polymeric films can be improved by heating, rolling or stretching. It is also known that a film having improved physical properties in one direction is obtained by stretching the film in one direction and that balanced physical properties, in two directions, can be obtained by stretching a one-way stretched film again in a direction at right angles to the original direction of stretch. It is well known that a uniformly oriented film is less brittle than a film not uniformly oriented. However, no completely satisfactory process has been disclosed for obtaining a film having these balanced properties, particularly in continuous manufacturing where polymer quality or constitution fluctuates from day to day.

Many attempts have been made to develop processes for obtaining balanced orientation during stretching. The optimum balance is achieved at the point of minimum birefringence. It is known that the final orientation of a film can be influenced by varying the extent of the first and second stretchings. It has been observed that very often if a film is stretched 3 times in one direction and 3 times in a direction at right angles to the direction of the first stretching, it does not have balanced physical properties. Prior art processes have proceeded on the assumption that balanced orientation was obtained; however, it has been found that this is only true if simultaneous stretching under uniform conditions in two directions is used. Delay between the first stretching and the second stretching, variations in polymer composition, such as in the molecular weight distribution or in the amount of side products formed, and, in particular variations in the stretching temperature, seriously upset this balance.

As a result, in prior art processes it is necessary to continuously monitor the process by checking birefringence and polymer composition and by making adjustments in stretching ratio, temperature and the like. This is not only time-consuming but requires complicated instrumentation and additional personnel.

An object of this invention is to provide an improved and practical process for making biaxially oriented polymer films having balanced physical properties. Another object of this invention is to provide a process which permits the manufacture of oriented polymer films with optimum balance of physical properties. Yet another object is to provide a process which is not influenced by day-to-day variations in polymer composition. A further object is to provide a process which can be controlled readily to give a film with a balanced orientation. A still further object is to provide such a process which does not require the continuous monitoring which is required by prior art procedures. Still further objects will be apparent from the following description of the invention.

This invention in its broad aspect embodies a process for making an oriented film having balanced properties comprising stretching a film of an orientable, crystallizable polymer in two directions which are at right angles in the major plane of the film in two steps, the first stretching step being in one of the directions longitudinal or lateral of the film and the second stretching step being at a right angle to such direction; characterized in that the work done in the second stretching step is controlled within a limited range as a function of the work done in the first stretching step so that a film with balanced properties is obtained.

This process, wherein the work in the two stretching steps is so controlled, is particularly applicable to films of orientable, crystallizable, organic linear polymers which may vary in the rate of crystallization due to minor changes in the constitution of the polymer. In the case of such orientable, crystallizable, organic, linear polymers, which in the form of filaments show by characteristic X-ray patterns molecular orientation along the fiber axis, the second stretching step can be controlled in accordance with the formula $$W_2 = a + bW_1$$

where $W_2$ is the work in the second stretching step, $W_1$ is the work in the first stretching step, "$a$" is a constant which in the case of polyethylene terephthalate films as described below is from about $-0.2$ to about $-1.0$, and "$b$" is a constant which in such case is from about 2.0 to about 9 and represents the slope of the work curve, which is characteristic of the particular type of polymer. The constant "$a$" must be in the same units as $W_1$ and $W_2$. In this particular formula, for convenience, inch-pounds per square inch per mil of initial film thickness has been used. The constant "$a$" is probably affected by the time interval between the two stretching steps. That is, this constant is influenced by relaxation of internal stresses, deorientation, etc., which occur between the first and second stretching steps.

With respect to physical properties, it may be pointed out that these properties include thickness, uniformity, brittleness, impact strength, yield point, modulus, birefringence, break point, inter alia. The term birefringence is defined as the difference between the maximum and minimum refractive indices in any given plane of an anisotropic light-transmitting material.

In practicing the invention, it is easy to determine by simple tests the work requirements and data prescribed above. Thus, two relatively simple experiments can be performed. First, a determination is made of the work required in the first stretching to produce a given refractive index in the direction of the first stretching. Birefringence and refractive index for first stretching are comparable terms as the refractive index in the unstretched direction remains virtually unchanged. This determination may be made by selecting an unstretched film sample and stretching it in one direction, while restraining the film to prevent neck-down, using a tensile stress-measuring instrument, e.g., an "Instron Tensile Tester." The work expended is recorded, and the refractive index or birefringence resulting for various amounts of work is measured using a refractometer or polariscope. When these data are plotted on a graph with work for the stretch as the ordinate and refractive index or birefringence as the abscissa, a straight line relationship is apparent.

Next, the film is stretched in the second direction by using the same procedure as outlined in the preceding paragraph. If these data are plotted on a graph with the work of second stretch as the ordinate and birefringence as the abscissa, one finds that a point of minimum birefringence results for a specific amount of work expended for each sample. These points of minimum birefringence are then plotted on a graph showing the work of first stretching and the work of second stretching. Surprisingly, it is found that these points fall along a straight line. From this graph the formula $W_2 = a + bW_1$ is obtained.

In the attached drawings which constitute a part of this application and serve to illustrate the invention further, Fig. 1 is a graph showing the index of refraction in the direction of stretching of one-way stretched films of the type described in Example I plotted as the ordinate, with work done in stretching these films plotted as the abscissa, Fig. 2 is a graph with curves showing the work in the second stretching of one-way stretched films of the type described in Example I plotted as the ordinate with birefringence after the second stretching plotted as the abscissa and including a reference table of the one-way stretched films used.

Figure 5:
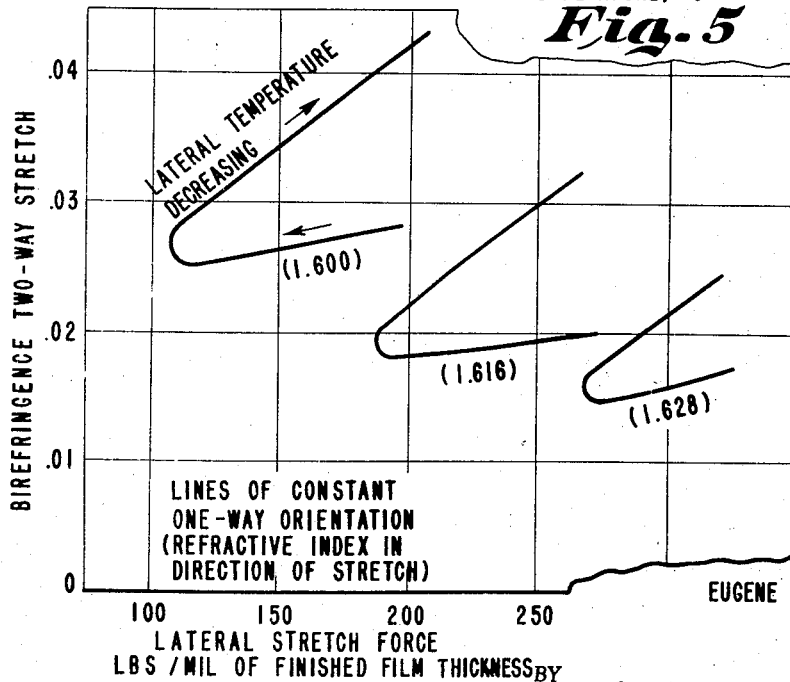

Fig. 3 is a graph showing the work at minimum birefringence in the second stretching step plotted as the ordinate and work of the first step plotted as the abscissa. The line has the formula $W_2 = -0.54 + 6.70W_1$, Fig. 4 is a graph with the lateral stretching force in pounds per mil of oriented film plotted as the ordinate and the lateral stretching temperature plotted as the abscissa, and Fig. 5 is a graph with birefringence plotted as the ordinate and lateral stretching force plotted in pounds per mil of finished film thickness as the abscissa.

In applying these data to the biaxial orientation of a polymer film on a continuous commercial scale, a level of physical properties to be obtained in the finally oriented, essentially isotropic film is selected. It is known that the level of physical properties of films of the orientable linear polymers described above increases with increasing orientation. Hence, if a high level of physical properties is desired, the work in the first stretching step should be selected to give the corresponding high orientation. Since the work in the first stretching step is, for practical purposes, linearly related to the refractive index, which is a measure of orientation, a constant work level is maintained. This may be controlled automatically by controlling the power input to the stretching apparatus. Effective methods for maintaining constant power input involve varying the temperature of the linear polymer being stretched, varying the stretching ratio or varying the stretching rate.

The second stretching step may be controlled in the same manner as the first stretching step. The correct amount of work required to give minimum birefringence is selected from the graph or computed using the formula $W_2 = a + bW_1$. The power input to the second stretcher is adjusted to maintain $W_2$ at a constant level. As in the first stretching step, known automatic devices can be used to vary the temperature, stretching rate or stretching ratio and thereby maintain a constant power input. Thus, a film is obtained having the optimum balance of physical properties.

The above discussion and graphs in the drawings make manifest the surprising nature of the present invention and establish that the work of the second stretching step at the point of minimum birefringence bears a linear relationship to the work of the first stretching step, and furthermore establishes, what is entirely unexpected, that this relationship is unaffected by many extraneous variables, e.g., the differences in the rate at which different samples of polymer crystallize.

The process of the invention is thus carried out in a manner quite different from the conventional biaxial stretching processes of the prior art. In such latter processes, stretching temperature, stretching rate and stretch ratio are preset to yield a given orientation; however, this orientation will vary if polymer composition varies.

The process of this invention can be carried out in various known stretching apparatus. Suitable apparatus is schematically shown in Alles & Saner U.S. Patent 2,627,088 issued Feb. 3, 1953 and Alles U.S. Patent 2,779,684 issued Jan. 29, 1957. The apparatus described in Alles & Heilman U.S. 2,728,941 issued Jan. 3, 1956, Fig. 2, is particularly well suited for this purpose. Also the process is especially applicable to the polymer and coated polymer films disclosed in these patents.

The following examples serve to further illustrate, but are not intended to limit, this invention:

*Example I*

A 38-mil thick polyethylene terephthalate film of the type described in Whinfield & Dickson U.S. Patent 2,465,319 issued Mar. 22, 1949, was stretched three times in one direction using an "Instron Tensile Tester." Before stretching, it had a crystallization half-time at 140° C. of 1.33 minutes, i.e., this is the time required for crystallization to be half completed and was determined from density measurements. The sample was restrained by clamps so that neck-down did not occur between the spaced stretch points. The temperature of the film was maintained at 80° C. during the stretching operation. The work of stretching was measured and found to be about 0.37 inch-pounds per square inch per mil of original thickness. The refractive index of the stretched film in the direction of stretching was 1.600.

The work level required for the second stretching to give the optimum balance of physical properties (minimum birefringence), $W_2$, was then determined using the relationship $W_2 = -0.54 + 6.70W_1$ where $W_1$ = work of first stretch, and $W_2$ was found to be 1.9 inch-pounds per square inch per mil. The one-way stretched material was then stretched three times in a direction at a right angle to that of the first stretching on the "Instron Tensile Tester," and the temperature was adjusted so that the work done equalled 1.9 inch-pounds per square inch per mil. The film was clamped along the edges to prevent neck-down.

The birefringence of the stretched film was measured with an "Abbe" refractometer manufactured by the Zeiss Optical Company and found to be 0.022.

*Example II*

Example I was repeated for a sample having a crystallization half-time at 140° C. of 0.30 minute, except that the work of first stretching was 0.56 inch-pounds per square inch per mil, and the work required for the second stretching, determined by the relationship $W_2 = -0.54 + 6.70W_1$ was found to be 3.2 inch-pounds per square inch per mil. The birefringence of the stretched film was found to be 0.015.

*Example III*

A 38-mil thick polyethylene terephthalate film of the type described in U.S. Patent 2,465,319 was stretched in two directions using the apparatus shown in Fig. 2 of U.S. Patent 2,728,941. It had a crystallization half-time of 3.5 minutes at 140° C. The force of stretching, which is a measure of work, was obtained using torque bar type indicators on the inlet and outlet pull rolls of the longitudinal stretcher and bonded wire strain gauges in the lateral stretcher. A force of longitudinal stretching of about 10 pounds per inch was used. The one way stretched film had a refractive index of 1.615 in the direction of stretching.

The film was then stretched in the lateral stretcher at a rate of about 833% elongation per minute. A force of about 18 pounds per inch, determined by the relationship $W_2 = -0.54 + 6.70 W_1$, was achieved by adjusting the temperature in the lateral stretching. A film having a birefringence of 0.018 and a uniform thickness of 4 mils was obtained.

Example IV

Example I was repeated with a similar polyester and the stretching ratio was changed in the second stretching step to 2.8 times. The work in the first stretch was 0.29 inch-pounds per square inch per mil. The work in the lateral stretch was determined as in Example I and found to be 1.40 inch-pounds per square inch per mil. A 4.3 mil film having a birefringence of 0.026 was obtained.

Example V

Example III was repeated except that the polymer characteristics were varied (a) by increasing the diethylene glycol content from 3 to 5 mol percent without changing any other factor, (b) by increasing the unconverted dimethyl terephthalate content from .01 to .10 percent by weight without changing any other factor, and (c) by increasing the degree of polymerization, as measured by "intrinsic viscosity" as described in Alles & Saner U.S. Patent No. 2,758,105, from 0.53 to 0.60 without any other change. The changes in characteristics were made without any other change in the process. The changes above made no significant change in the relationships or in the results obtained in the stretching of the film as stated in Example III.

During longitudinal (e.g., first) stretching, the force remains constant so that work done is directly proportional to the force. In the lateral (e.g., second) stretching, the force is not constant, but an average value may be used which is proportional to the work in said second stretching. It is clear that the invention is not limited to the foregoing examples. The relationship between the force of the first stretching step and the force of the second stretching step to give minimum birefringence can be determined in a different way. Fig. 4 of the drawing shows that for a given orientation of a one-way stretched polyethylene terephthalate film there exists a temperature at which force in the second stretching step will be at a minimum. This point of minimum force, however, is not necessarily the point of minimum birefringence. For a typical polyethylene terephthalate film about 2 to 3° C. must be added to the stretching temperature to give a force necessary to produce minimum birefringence. This is shown in Fig. 5 of the drawings.

In practicing the process just mentioned, the equipment described in Example III is used. Work of stretching is measured in the longitudinal and lateral stretchers in terms of power supplied to the stretching units as recorded by an ammeter. Then, for the various amperage levels (power levels) of longitudinal stretching, curves of amperage required in lateral stretching at various stretching temperatures are obtained. A point of minimum amperage level is found. A temperature increase of 2° C. is added to the temperature at this point, and the amperage at that level is read. These points are plotted on a graph, amperage of first stretching vs. amperage of second stretching, giving a relation of the type shown in Fig. 3.

In carrying out the process, the work can be measured and controlled by the use of ammeters, strain gauges, etc.

The invention can be used in biaxially orienting cast or extruded films of orientable polymers of the type described in Carothers U.S. Patents 2,216,736 and 2,216,735 issued Oct. 7, 1950 and the aforesaid patent 2,465,415 and other patents listed above, including such films having a thin surface coating of various polymer, e.g., set forth in the Alles Patent 2,779,684 issued Jan. 29, 1957. These films are generally oriented to produce finished film thickness between 0.25 and 10 mils.

An advantage of this invention is that it provides a practical and dependable process for the manufacture of polymer films of uniform properties. It permits the manufacture of thin films whose physical properties are in balance in all directions in the major plane of the film. It enables one to manufacture on a commercial scale and continuously such films in which brittleness is minimized.

The invention has the further advantage that it overcomes the difficulties of the normal prior art procedures which are caused by variations in polymer composition. The invention makes the manufacture of photographic film base and related films more easy to control, and it does not require constant measurements of orientation, (e.g., sampling).

By the processes of this invention using the work of stretching (or power, for continuous operation) a film is obtained having an orientation which is always balanced to the optimum extent irrespective of fluctuations in polymer composition which occur normally.

What is claimed is:

1. In a process of stretching a continuous length of an orientable, crystallizable linear polymer film in two directions at right angles in the major plane of the film in which the film is stretched a substantial amount first in one said direction and then in the other said direction as consecutive steps, the improvement which comprises maintaining constant the desired level of orientation in said first stretching step by maintaining the work of stretching per unit volume of film constant during said step and determining the level of work per unit volume in the second stretching step required to obtain a film exhibiting minimum birefringence by taking sample of said film which has been substantially stretched in one direction and stretching said sample in said second direction to obtain a film exhibiting minimum birefringence, and then stretching the continuous length of film which has been stretched in one direction, and any other continuous length of film of the same type which has been so stretched, in said second direction at said determined work level, and thereafter maintaining the work per unit volume of the film constant at said second level during the second stretching step.

2. A process as defined in claim 1 wherein said polymer is a polyester corresponding to the reaction product of a dicarboxylic acid and a dihydric alcohol.

3. A process as defined in claim 1 wherein said polymer is a polyethylene terephthalate.

4. A process as defined in claim 1 wherein the work is controlled by means of electrical power input.

5. A process as defined in claim 1 wherein said polymer is stretched approximately three times longitudinally and three times laterally to form an oriented film having a thickness of 0.25 to 10 mils.

6. In a process of stretching a continuous length of an orientable crystallizable linear polymer film in two directions at right angles in the major plane of the film in which the film is stretched a substantial amount first in one direction and then in the other direction as consecutive steps, the improvement which comprises maintaining constant the level of orientation desired in said first stretching step by maintaining the work of stretching per unit volume constant by varying the temperature of stretching during said step, determining the level of work per unit volume of the film in the second stretching step required to obtain a film exhibiting minimum birefringence by taking a sample of said film which has been substantially stretched in one direction and stretching said sample in said second direction to obtain a film exhibiting minimum birefringence and then stretching the continuous length of film which has been stretched in one direction, and any other continuous length of film of the same type which has been so stretched, in said second direction at said determined work level, and thereafter maintaining the work per unit volume of the film constant at said second level by varying the temperature during said second stretching step.

7. In a process of stretching a continuous length of an orientable, crystallizable polyethylene terephthalate film in two directions at right angles in the major plane of the film in which the film is stretched a substantial amount first in one direction and then in the other direction as consecutive steps, the improvement which comprises maintaining constant the level of orientation desired in said first stretching step by maintaining the work of stretching per unit volume constant by varying the temperature of stretching during said step, adjusting the temperature for the second stretching step to obtain a minimum value of work per unit volume of said film, increasing the temperature about 2° to 3° C. above that necessary to produce said minimum value, determining the work level at said increased temperature and maintaining said latter work level constant by varying the temperature during the second stretching step.

References Cited in the file of this patent

UNITED STATES PATENTS

| | | |
|---|---|---|
| 2,763,029 | Tullose | Sept. 18, 1956 |
| 2,779,684 | Alles | Jan. 29, 1957 |